United States Patent Office 3,247,979
Patented Apr. 26, 1966

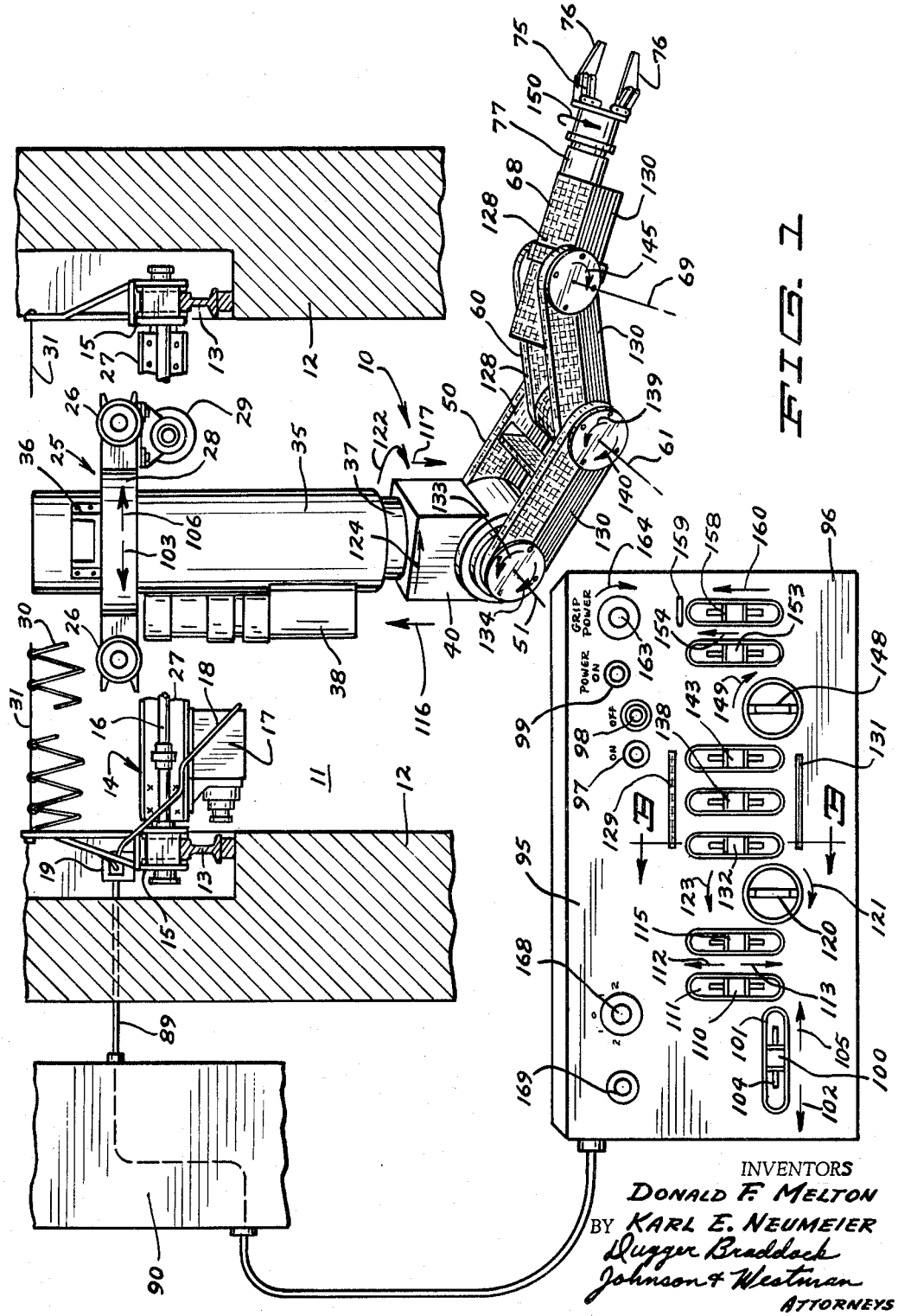

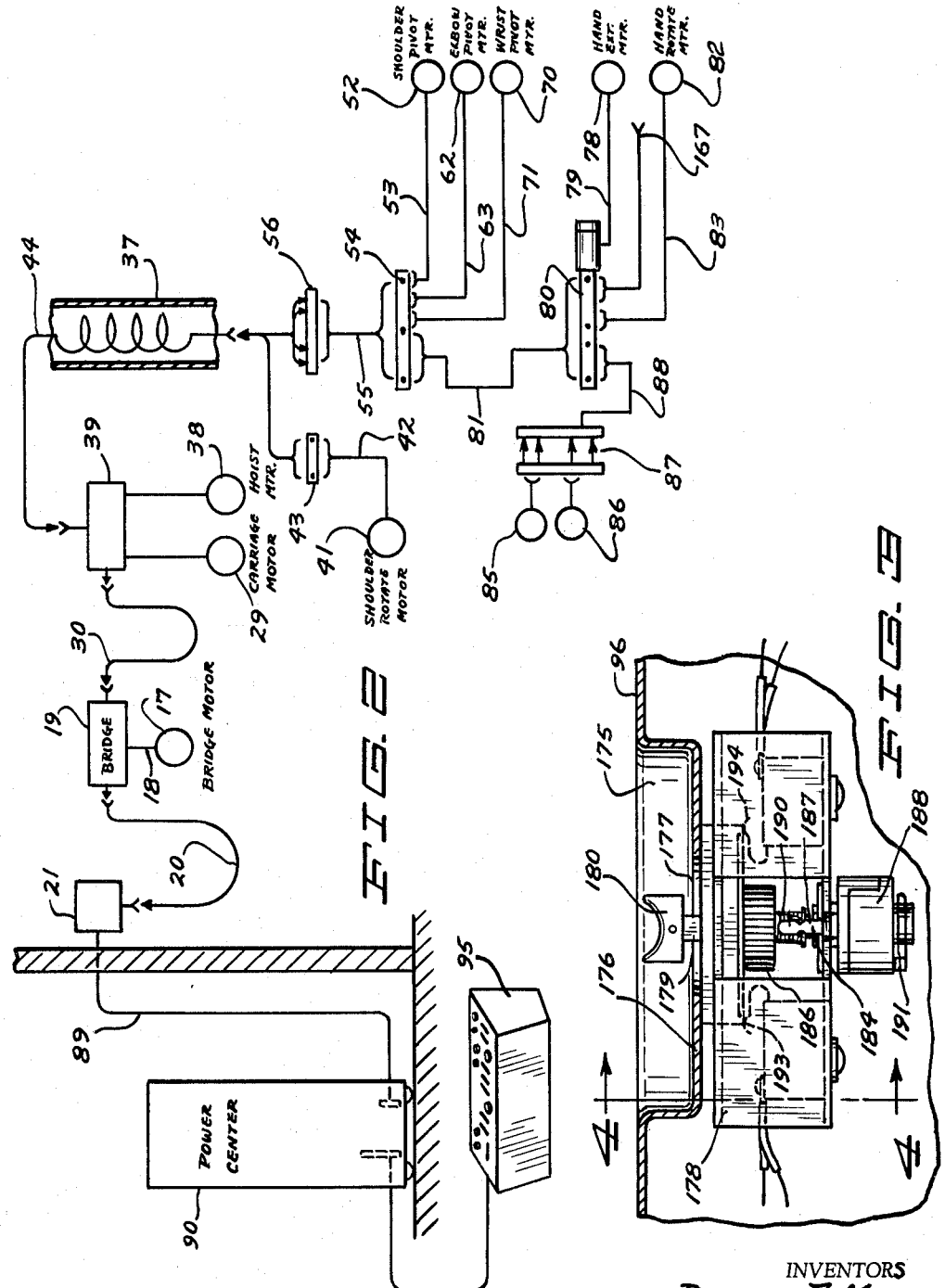

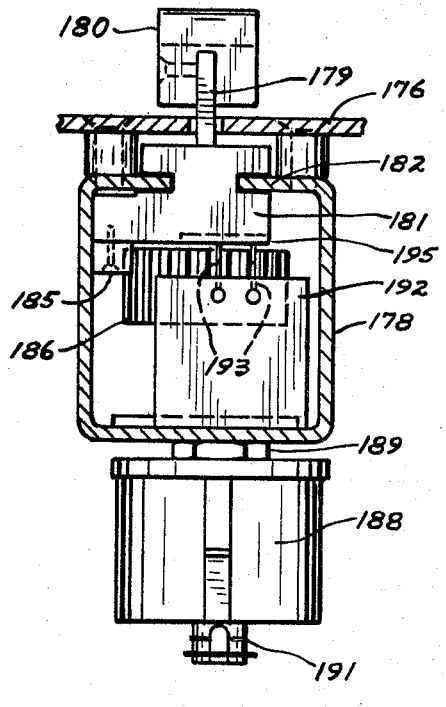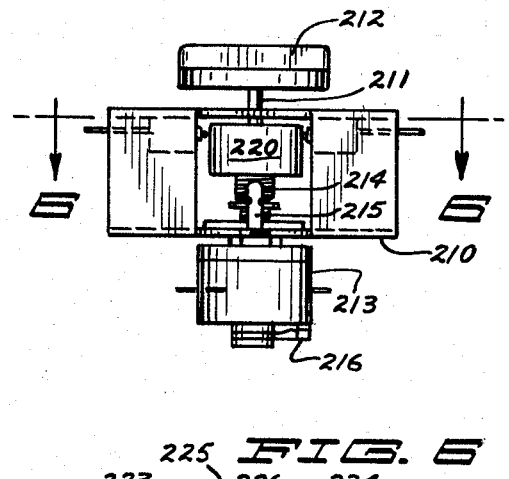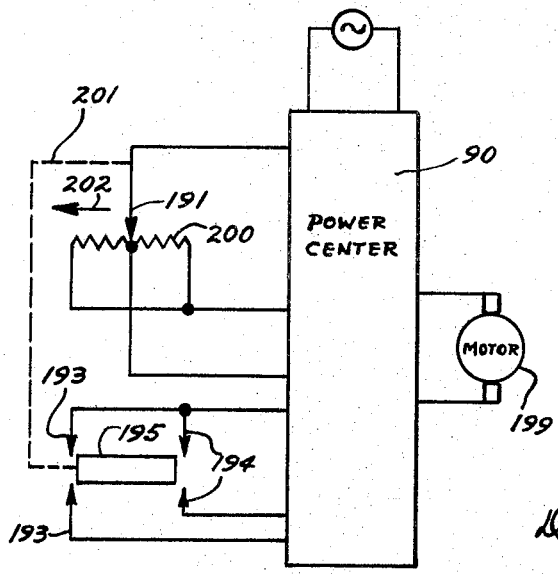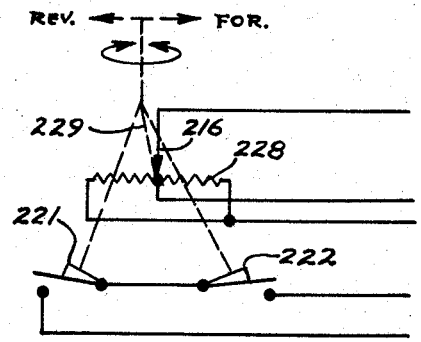

3,247,979
MANIPULATOR CONTROL SYSTEM
Donald F. Melton, Minneapolis, and Karl E. Neumeier, Stillwater, Minn., assignors to Programmed & Remote Systems Corporation, St. Paul, Minn., a corporation of Minnesota
Filed Dec. 14, 1962, Ser. No. 244,694
13 Claims. (Cl. 214—1)

The present invention has relation to a manipulator control and more particularly to a manipulator control system wherein the control elements operate in a manner so as to minimize operator confusion and simplify manipulator operation.

The use of remotely controlled handling equipment, particularly for radioactive material, has increased tremendously in recent years. Various types of control systems have been advanced and while the maneuverability and operability of the manipulators has steadily become better, much need has existed for a control console that makes operation of the manipulator safe, sure and accurate.

In order to simplify operation of the manipulator of the present invention, the control console is designed so that the control elements operating the various functions of the manipulator are grouped in natural groupings. The elements are oriented so that upon movement of an element in a certain direction the manipulator will also move in the same direction as the element. Further, the controls are wired so that the speed of travel of the manipulator is directly proportional to the displacement of the control element from its off position.

On the control elements for the arm assembly of the manipulator, which can be reversed in operation so that the movement of the arm and the control element cannot be directly correlated, color coding or similar symbol coding of the elements is used. By suitable coding, the element, when moved in a given direction, will cause the manipulator arm segment which it controls to move toward or in direction of the corresponding coding on the arm segment.

Similarly where rotary motions are involved a clockwise movement of the control element will cause clockwise movement of the actuated portion of the machine.

The control console is designed so that all of the elements are located in recesses and are essentially flush with or are below the top surface of the console to prevent accidental actuation of the switches. The voltage in the control console is maintained at a low level to avoid shock hazards and all of the high voltage components are used in a power center located remotely from the position of the operator.

By utilizing suitable controls the operation of the manipulator thus is vastly simplified and designed to eliminate confusion during manipulator operation.

It is an object of the present invention to present a control system for a manipulator that simplifies operation of the manipulator itself.

It is a further object of the present invention to present a control console having control elements for operating the manipulator grouped in the natural groupings for a minimum of confusion.

It is a further object of the present invention to have control elements which when moved in a certain direction will cause the control portion of the manipulator to move in the same direction.

It is another object of the present invention to present a control console wherein the control elements are designed so that displacement of the element is proportional to the speed of operation of the controlled portion of the manipulator.

It is a still further object of the present invention to present a control console wherein the control elements are recessed to avoid accidental operation.

It is another object of the present invention to present a control console wherein low voltage only is utilized to avoid shock hazards.

Other and further objects are those inherent in the invention herein illustrated, described, and claimed, and will become apparent as the description proceeds.

To the accomplishment of the foregoing and related ends, this invention then comprises features hereinafter fully described and particularly pointed out in the claims the following description setting forth in detail certain illustrative embodiments of the invention, these being indicative, however of but a few of the various ways in which the principles of the invention may be employed.

The invention is illustrated by reference to the drawings in which corresponding numerals refer to the same parts, and in which:

FIG. 1 is a perspective view of a remotely controlled manipulator with parts in section and parts broken away and a top plan view of a control console for operating the manipulator;

FIG. 2 is a schematic representation of a control system for a manipulator;

FIG. 3 is a fragmentary enlarged sectional view taken as on line 3—3 in FIG. 1;

FIG. 4 is a sectional view taken as on line 4—4 in FIG. 3;

FIG. 5 is a side elevational view of a typical rotary switch used with the manipulator console of the invention;

FIG. 6 is a sectional view taken as on line 6—6 in FIG. 5;

FIG. 7 is a schematic representation of a typical linear switch circuit used to control a manipulator motor; and FIG. 8 is a schematic representation of a typical rotary switch used in the control console of the invention.

Referring to the drawings and the numerals of reference thereon, a remotely controlled manipulator shown generally at 10 is for use within a room 11 wherein radioactive materials or other hazardous materials are to be handled. The room 11 has walls 12, 12. A pair of tracks 13, 13 are mounted on the walls 12, 12 and are spaced apart. The tracks extend along the length of the room and a bridge assembly 14 is mounted on rollers 15 which are mounted on the tracks. The rollers 15 are driven through a shaft 16 from a bridge motor 17.

The bridge motor drives the bridge along the tracks 13, 13. The bridge motor is variable speed and reversible. The bridge can be moved in either direction along the tracks. Power is supplied to the bridge motor through a power cord 18 that is connected to a junction block 19 mounted on the bridge and movable therewith. The junction block 19 is wired with a suitable electrical cable 20 to receptacle 21 that is connected to a source of power and the manipulator controls. (See FIG. 2).

A manipulator carriage 25 is mounted on rollers 26 which ride on transverse bridge rails 27 that extend between the tracks 13. The carriage has cross members 28 on which the rollers 26 are mounted. The rollers 26 are driven with an electric motor 29. The electric motor 29 is also reversible and the speed thereof can be controlled. A main power cord 30 is used to supply power to the electric motors on the bridge and is connected to junction block 19. The cord 30 is suspended on a cable 31 extending between the end portions of the bridge and movable with the bridge. The cord 30 is coiled and will automatically be payed out and returned as the carriage moves back and forth along bridge rails 27.

A telescoping tube support 35 is mounted on brackets 36 and brackets 36 in turn are mounted on cross members 28 of the carriage. Telescoping tube support 35 is comprised of a plurality of axially slidable nested tubes. An inner tube 37, which is slidably mounted within the outer tubes, is movable in a vertical direction. A hoist motor 38 and gear set is utilized to control and power a cable for raising the inner tubes. The tubes will lower under force of gravity when the motor is reversed. The carriage motor and the hoist motor both receive power through the main power cord 30. A junction block 39 (FIG. 2) is provided on the carriage for connecting the wires.

The bridge carriage and telescoping tubes described are typical mountings for manipulators. Many manipulators are also mounted directly to the walls of the room or on vehicles that are movable within the room. The control concept to be described applies to all of these mechanisms as well.

A shoulder member 40 is attached to the inner tube 37 of the telescoping tube support. The shoulder member is mounted to be continuously rotatable about the vertical axis of the telescoping tubes in either direction of rotation. The shoulder member 40 is powered with a shoulder rotating motor 41, shown schematically in FIG. 2. The shoulder rotating motor is powered through a cord 42 extending from a junction block 43 mounted inside telescoping tube 37. Power is supplied to the junction block 43 through a coiled cord 44 extending downwardly through the interior of the inner tube 37. The coiled cord 44 extends from junction block 39 and is wired to a power source and the controls through the main power cord 30.

An upper arm 50 is mounted to shoulder member 40 and is movable about a shoulder pivot axis illustrated at 51. The upper arm is controlled by an upper arm pivot motor 52 (FIG. 2) and is movable in either direction about axis 51 in a predetermined arc. The upper arm pivot motor 52 is powered through a cord 53 extending from a junction block 54 that is mounted within the shoulder member 40. The junction 54 is connected with a cord 55 through a slip ring and brush assembly 56 to the coiled cord 44 within the telescoping tube. The slip ring and brsuh assembly 56 permits the shoulder member 40 to rotate continuously and at the same time transmit electrical power to the junction block 54.

The upper arm pivot motor 52 is connected through suitable mechanism to the upper arm and in this manner drives the upper arm about its axis 51. The upper arm pivot motor corresponds to movement of a human upper arm about its shoulder pivot.

A forearm member 60 is connected to a lower portion of the upper arm member 50 and is movable about an elbow axis 61. The forearm member 60 is controlled wtih a forearm motor or elbow pivot motor 62 which is also mounted in shoulder member 40. The elbow pivot motor is powered through a cord 63 extending from junction block 54. The forearm member is movable about elbow axis 61 in either direction of rotation for a predetermined arc.

The elbow pivot motor 62 is connected through suitable drive chains and mechanism to the forearm 60. The chains extend through the upper arm members and are mechanically connected to the forearm.

A wrist assembly 68 is mounted about a wrist axis 69 to the lower portion of the forearm member 60. The wrist assembly 68 is powered with a wrist pivot motor 70 that is mounted in the shoulder member 40 and is powered through a cord 71 extending from junction block 54. The wrist assembly 68 is movable about wrist pivot axis 69 through suitable chains and mechanism connected through the forearm and upper arm members to motor 70 and is movable in either direction of rotation about axis 69 through a predetermined arc.

A hand member 75 having a pair of gripping jaws 76, 76 is mounted in the wrist assembly 68. The hand member is mounted on an extendable member 77 that is slidably mounted in the wrist assembly 68. The extendable member 77 is driven through a hand extension motor 78 that is wired through a wire 79 extending from a junction block 80. The junction block 80 is wired through a cord 81 to junction block 54. Cord 81 extends through the arm members to the wrist assembly.

The hand member 75 is also rotatably mounted with respect to the telescoping member 77 and is rotatable about a longitudinal axis of the member 77. The hand member 75 is rotated with a hand rotating motor 82 which is wired through a cord 83 to junction block 80 mounted in the wrist assembly. The hand rotating motor is mounted in the wrist assembly 68. The hand is continuously rotatable in either direction of rotation about the axis of tubular member 77.

The gripping jaws 76 are opened and closed through operation of a grip motor 85. The grip motor is reversible so that the jaws can be opened and closed.

In addition, the force applied by the gripping jaws 76 is controlled through an electro-magnetic clutch illustrated schematically at 86. The clutch and grip motor are powered through a slip ring and brush assembly 87 mounted within the wrist housing. The slip ring and brush assembly is wired through a cord 88 to the junction block 80.

The various motors previously described are utilized to operate the remotely controlled manipulator. The control wires are all wired through the main receptacle 21. A power cord 89 extends from the receptacle 21 to a power center 90. The power cord 89 extends through the wall 12 to the power center. The power center houses magnetic amplifiers and transformers which convert high voltage alternating current to the current necessary for operating the motors on the manipulator. The power center in turn is connected to and controlled from a control console 95. The control console houses all of the various control elements for operating the motors of the manipulator.

In FIG. 1 it will be seen that the console 95 has a top panel 96 on which there are mounted controls for the manipulator. The controls include an "on" switch 97 and an "off" switch 98. A "power on" indicator light 99 is provided. The on-off switch controls the power to all of the various motors for the manipulator. It is to be noted that the voltage in the control console is low, being operated at a maximum of 30 volts. The power center 90 houses suitable amplifiers and controls for driving the manipulator motors. For large manipulators that require high voltage power the high voltage is handled in the power center and not in the control console.

The various motor controls are arranged on the top panel of the control console so that movement of the control elements thereof will cause corresponding movement of the manipulator. The carriage 25 is controlled with a linearly movable control element 100 which is mounted in a recess 101 shown typically in FIG. 3. The control element 100 does not protrude above the top surface of the top panel and therefore cannot be accidentally bumped and actuated. By moving the control element in direction as indicated by arrow 102 a suitable switch is turned on to actuate the motor for the carriage 29 in direction to propel the carriage in a corresponding section indicated by arrow 103 in FIG. 1. Movement of the element 100 a small amount causes very slow movement of the carriage. Moving the element further along its provided slot 104 causes a corresponding increase speed of movement of the carriage. The movement of the element and the rate of movement of the carriage are directly proportional. Control element 100 is automatically spring centered and when released will return to neutral thus stopping the motor 29. All of the motors used on the manipulator are dynamically braked and will stop quickly upon shutting off of the power.

Movement of the control element 100 in direction as indicated by arrow 105, past the neutral or off position causes the motor 29 to be reversed and the carriage will move in direction as indicated by arrow 106. The more the displacement of the element 100 in this direction, the faster the carriage will move.

A bridge control element 110 is mounted in a recessed portion 111, of the console and upon movement of the conrtol element 110 in direction as indicated by arrow 112 will cause the bridge motor 17 to be actuated. The motor will propel the bridge assembly along tracks 13 in direction away from the operator or, as shown in FIG. 1, into the plane of the paper. Upon movement of the control element 110 the bridge motor 17 is actuated slowly and as the element 110 is further displaced in direction as indicated by arrow 112 the speed of the motor 17 is increased. The element 110 is also spring centered and upon release will return to the off position thereby stopping the bridge motor quickly, as this motor is also dynamically braked. Upon movement of the control element in direction as indicated by arrow 113 the direction of the rotation of motor 17 will be reversed and the bridge will be moved along rails 13 in opposite direction or toward the operator. This will be upward out of the plane of the paper as shown in FIG. 1.

A control element 115 is used to operate the hoist motor 38 which raises and lowers the shoulder 40 which is attached to telescoping tube. The element 115 is also recessed below the surface of the top panel as the other two elements. Upon actuation of the element 115 in direction as indicated by arrow 112 the hoist motor 38 will be operated in direction so that the shoulder portion 40 will raise and move in direction as indicated by arrow 116. Upon initial movement of the control element 115 the motor 38 is actuated slowly and as the control element 115 is further displaced the speed of rotation of motor 38 increases. The element 115 is spring centered and returns to the off position when released.

Upon actuation of the element 115 in direction as indicated by arrow 113 the hoist motor will be operated in opposite direction and will cause the telescoping tubes to be lowered. Again, displacement of the element 115 is proportional to the speed of rotation of element 38 and fast rotation can be accomplished by further displacement of the element. The movement of element 115 in direction as indicated by arrow 113 causes the shoulder to lower in direction as indicated by arrow 117.

A rotary control element 120 is rotatably mounted in the top panel 96 of the control console. The control element 120 is also recessed or positioned below the surface of the top panel. Control element 120 controls the shoulder rotate motor 41. Upon rotation of the control element 120 in direction as indicated by arrow 121 the shoulder will rotate in direction as indicated by arrow 122. As the element 120 is rotated the speed of the motor 41 will increase proportional to the rotation of the control element. The control element is also spring centered and will return to neutral or "off" upon release. By rotating the control element 120 in direction as indicated by arrow 123 past the off position the rotation of motor 41 is reversed and the shoulder will rotate in direction as indicated by arrow 124.

The controls for the upper arm, the forearm and the wrist assembly are grouped together in the center of the panel 96. As can be seen in FIG. 1 the upper portion of the arms and wrist assembly are coded by suitable design or color indicated at 128. A short code bar 129 adjacent the top of the controls for the arm and wrist is also coded with this same configuration or color. The lower portions of the arms and wrist are coded with a suitable pattern or color indicated at 130. A code bar 131 is positioned below the control switches for the arms and wrist and has an identical pattern to that shown at 130.

When the control element 132, which controls movement of the upper arm about its axis 61 is moved toward code bar 129 the arm will move in direction as indicated by arrow 133 or, in other words, toward that portion of the arm which has the same code as code bar 129. Thus the operator merely looks at the manipulator arm that he is remotely controlling and if he wants to move the upper arm 50 in direction as indicated by arrow 133 moves the control element 132 toward the same code on the console. Conversely, if the control element 132 is moved past the off position toward code bar 131, the arm will also move in direction so as to be moving toward the code 130 or in direction as indicated by arrow 134.

The control element 132 controls the speed and direction of rotation of the motor 52. The control element 132 is spring centered and will return to the off position when released. Increased displacement of element 132 causes increased speed of rotation of the motor 52.

Control element 138 is used to control the elbow pivot motor 62 which in turn controls the movement of forearm 60 about its axis 61. Movement of the control element 138 toward code bar 129 will result in movement of the forearm in direction as indicated by arrow 139. As is the case with the upper arm the forearm moves toward the same code as its element 138. By moving the control element 138 in direction toward code bar 131, past its off position, the direction of rotation of motor 62 is reversed and the forearm will move in direction as indicated by arrow 140 about its axis 61.

A control element 143 is used to operate the motor 70, which controls the pivoting of the wrist assembly 68 about its axis 69. Movement of the control element 143 toward code bar 129 will cause rotation of the wrist assembly in a corresponding direction or toward its corresponding code. Movement of the control element 143 past its off position and toward code bar 131 will cause rotation of the wrist assembly toward that code 130 or movement in direction as indicated by arrow 145.

All of the control elements 132, 138 and 143 which control movement of the upper arm, forearm and wrist assembly, respectively, are recessed, as previously explained and are linearly movable. The elements are also used to control the speed of rotation as well as the direction of rotation of the various portions of the manipulator arm. The control elements 132, 138 and 143 are spring centered and return to the off or center position when released.

A rotary control element 148 is utilized to control motor 81 which in turn causes the hand member 75 to rotate. Rotation of the control element 148 in a clockwise direction as indicated by arrow 149 will cause rotation of the hand in that direction, as indicated by arrow 150.

The control element 148 is spring loaded and will return to the off position when released. When turned past the off position in opposite direction, as indicated by arrow 149, the wrist will rotate in opposite direction therefrom. Increased displacement or rotation of the element 148 causes increased speed of rotation.

The hand 75 is continuously rotatable in either direction of rotation. Thus the hand can be positioned as desired.

A linearly actuated control element 153 is used for controlling the hand extension motor 78. By moving the element 153 in direction as indicated by arrow 154 the hand will be extended. This corresponds to the movement of the hand of the operator at the console. In other words, when the operator extends his hand to move element 153 in direction as indicated by arrow 154, the hand of the manipulator will also extend. The control element 153 is spring loaded and will return to the off position at the center of its travel. By moving the element 153 in opposite direction from arrow 154 past the off position the hand will be retracted. This also corresponds to pulling the hand back or retracting the hand of the operator at the console.

Increased displacement of control element 153 past its off position will cause increased speed of extension or retraction of the hand.

A control element 158, which is linearly movable is utilized to control the grip motor 85. The motor 85 actuates the gripping jaws 76. A small bracket 159 is located on the top panel 96 of the control console and by grasping the bracket 159 with the fingers and the control element 158 with the thumb and then gripping, the operator at the console will move the control element 158 in direction as indicated by arrow 160. This will simulate gripping for the operator and will also cause the jaws 76, 76 to move together to grip an object.

Movement of the control element 158 in direction opposite from arrow 160 past its neutral or off point will open the gripping jaws.

As stated previously, the force exerted by gripping motor 85 is controlled with an electro-magnetic clutch 86. The amount of force transmitted by the clutch can be controlled to the utilization of a control element 163 which is rotary. By rotating the element in direction as indicated by arrow 164 the amount of force exerted by the gripping jaws 76, 76 is increased. The clutch will transmit torque up to a predetermined maximum amount. By adjusting the element 163 the amount of force transmitted by the clutch can be accurately controlled.

An auxiliary power receptacle 167 is wired to terminal block 80. Power to the auxiliary receptacle is controlled with a switch 169 on the control console, which must be depressed to turn the power on. A second switch 168 is provided to control the direction of rotation of the auxiliary tools.

The top panel of the console is tilted so that the back is higher than the front. This gives a sense of up and down to the control elements that control vertical motions. The flush mounting of the switches permit the top panel to be used as a hand rest for the operator to provide for more comfortable operation. The control switches are arranged sequentially from left to right. The farthest left switch controlling the mounting members and progressing to the right control members in order out to the hand. The rotary switches serve to divide the major groups of motions. (Mounting, arm and hand.)

Referring specifically to FIGS. 3, 4 and 7 a typical linearly movable switch is illustrated. It is to be understood throughout the description that the linear switches used on the control console are identical in operation and configuration and the following description is given as being illustrative of the underlying principles.

As stated previously all of the switch actuator elements on the control console are recessed from the control face plate or top panel 96. As seen a typical recess well 175 is provided in position for each of the control switches. The well 175 has a bottom panel 176 in which a slot 177 is provided. A switch housing 178 is mounted below the bottom panel 176. A control lever 179 is slidably mounted in slot 177 and is movable with respect thereto. A control element 180, which is typical of the control elements shown in FIG. 1, is attached to the lever.

Referring in particular to FIGS. 3 and 4, it can be seen that the lever 179 is attached to a slide member 181 which is made of a non-conductive material having a relatively low coefficient of friction, for example nylon. The slide member 181 is slidably mounted with respect to a top portion 182 of the switch housing 178 and is longitudinally movable with respect thereto. A rack 185 is fixedly attached to a bottom surface of the slide 181 and drivably engages a pinion gear 186 which in turn is drivably mounted on a vertical shaft 187 extending from a center tap rotary potentiometer 188. The potentiometer is fixedly attached as at 189 to the bottom surface of swtich housing. A torsion spring 190 is mounted over shaft 187 and is connected to an ear 184 integral with the switch housing so as to normally urge the shaft 187 and the wiper 191 of the potentiometer to its center position.

Upon movement of the control element 180 and the slide 181 rack 185 will cause the pinion gear 186 to rotate, thus rotating shaft 187 and moving wiper 191 away from its center position. When the element 180 is released the torsion spring 190 will center the shaft with the wiper 191 at its center position.

A separate block 192 of insulating material is positioned at each end of the switch housing 178. The blocks of material each mount two spring wire connectors or contactors 193, 193 and 194, 194 respectively. The contactor sets 193 and 194 are spring loaded and are normally resiliently urged against the bottom surface of the slide 181. The slide has a connector or shorting plate 195 fixedly attached to the bottom surface thereof and aligned with the spring wire contactors. It should be noted that the connector plate 195 does not extend to the end of the nylon slide block 181 but terminates short of the end. With the slide 181 in its center position both sets of spring wire contactors 193 and 194 are resting on insulating material and are not riding on the connector block. As soon as the switch is moved from its center position in either direction of movement the connector block will cause an electrical connection to be completed between the springs of one or the other of the sets of contactors 193 or 194, depending on the direction of movement. It should be noted that the contactors 193 and 194 are wired through suitable wires to the power center 90 and are electrically connected through suitable circuits to a typical manipulator motor 199.

When the switch is released and the spring 190 causes the element 182 to move to its neutral position with the contactors 191 in its center position on the potentiometer 188, the connector block will not be touching any of the spring contactors and the current to the motor 199 will be shut off. By reversing direction of movement of the element 180 the direction of rotation of the motor 199 will be reversed also.

Referring specifically to schematic diagram in FIG. 7, it will be seen that the wiper 191 of the potentiometer works on a resistance 200. The wiper is at a center tap, as shown. The contactors 193, 193 are located closely adjacent the connector block 195 as are the contactors 194, 194. The connection illustrated schematically at 201 extending between the wiper 191 and the connector block 195 is controlled by hand. Upon movement of the connector block 195 to position electrically connecting one set of contactors, for example 193, 193 the wiper 191 will move off its center position and power will be supplied to motor 199 through the power center 90. The power going to motor 190 will be such that the speed of the motor will be very slow when initially the element is moved. As the wiper 191 moves further across the resistance 200 in direction as indicated by arrow 202 the speed of motor 199 will increase. By moving the element 180 past its center position in direction opposite from that shown by arrow 202 the connector block 195 will complete an electrical connection between contactors 194, 194. This will cause the motor 199 to rotate in opposite direction from the previous direction. Again, the further movement of the wiper 191 in direction opposite from that indicated by arrow 202 across the resistance 200 will cause increase in speed of motor 199.

Referring specifically to FIGS. 5, 6 and 8, there is shown a typical rotary type switch used with the device of the present invention. As can be seen a control housing 210 is adapted to be mounted beneath the top panel 96 of the control console and has a control shaft 211 extending upwardly from the housing. A rotary control element 212 is mounted on the control shaft 211. The control element 212 is typical of the rotary control elements used on the control console. The shaft 211 extends from a rotary potentiometer 213 which is exactly the same construction of the potentiometer 188. The shaft 211 has a torsion spring 214 mounted thereon which acts against an ear 215 fixedly attached to the conrol housing 210. The potentiometer 213 has a wiper 216 which is operative to contact a resistance. The potentiometer 213 is a center tap potentiometer as used with the linear switch.

The potentiometer 213 is fixedly attached to the base of the control housing 210. The control shaft 211 has a cam 220 mounted thereon and positioned within the housing 210. A pair of micro-switches 221 and 222, respectively are mounted within the housing. The micro-switch 221 has an actuator button 223 and the micro-switch 222 has an actuator button 224.

The cam 220 has two reliefs 225 and 226, respectively. The reliefs are positioned so that when the control shaft is in its neutral position so that the center tap potentiometer is in the center of its travel, as adjusted by spring 214, neither one of the micro-switches 221 or 222 is closed. However, upon rotating the control element so as to move cam 220 in direction as indicated by arrow 227 the button 223 is contacted by a side surface of the cam and the micro-switch 221 is closed. When the control element 212 is released the torsion spring 214 will return the unit to center and both micro-switches will be open. By rotating the control element past the center position, in direction opposite from that indicated by 227, button 224 will be contacted by the side surface of the cam and micro-switch 222 will be closed.

Continued rotation of the control element 212 will move the wiper 216 of the potentiometer across its provided resistance 228 and this will in turn control speed of a motor controlled by the switch. The rotary switches are also wired through the power center as are the linear switches.

Referring specifically to FIG. 8 it can be seen that the wiper 216 is in the center of a resistance 228. The potentiometer and limit switches are mechanically connected through connector elements illustrated schematically at 229 so that upon rotation of the control elements the connectors will close one of the micro-switches 221 or 222 and continued rotation will cause the wiper to move across resistance 228 which is wired so as to control the speed of the motor. In this way the speed of the motor is controlled as well as the direction of rotation.

For convenience in controlling the speed and reversing rotation, the motors used are usually direct current motors.

What is claimed is:

1. In a manipulator having a shoulder portion, an upper arm portion pivotally mounted to said shoulder portion, a forearm pivotally mounted to said upper arm and a wrist member pivotally mounted to said forearm, a tool mounted on said wrist member, separate power means for pivoting said upper arm, said forearm, and said wrist member independently and selectively about their respective pivots in either direction of rotation, the improvement comprising separate coded indicia on said upper arm, forearm, and said wrist member for indicating the direction of movement of each of said members about their respective pivots, control means for controlling said power means, said control means including a control housing, separate linearly movable control elements mounted on said housing for actuating their corresponding control means, indicia on said housing corresponding to the indicia on said upper arm, said forearm and said wrist member and positioned to indicate direction of movement of said separate control elements to obtain corresponding direction of movement of said upper arm, forearm, and wrist member, respectively.

2. The combination as specified in claim 1 wherein said shoulder portion is mounted on a carriage that is linearly movable in a horizontal plane, said carriage being mounted on a bridge that is linearly movable in a horizontal plane in direction at substantially right angles to said carriage, separate power means for driving said carriage and bridge respectively, and separate control means for controlling said carriage and bridge, said last mentioned control means including a bridge control element and a carriage control element movable in planes substantially parallel to movement of its corresponding mechanism, said bridge control element and said carriage control element each being normally biased toward a center off position, movement of said bridge and carriage control elements in opposite directions from said off position causing opposite direction of movement of bridge and carriage, respectively, and increased displacement of said control elements from their off position causing a proportional increase in speed of movement of said bridge and carriage.

3. The combination as specified in claim 2 wherein said shoulder portion is mounted on said carriage for vertical movement with respect thereto, hoist power means for controlling vertical movement of said shoulder portion, and hoist control means for controlling said hoist power means, said hoist control means including a linearly movable element, said control element being movable from a center off position, movement of said control element in direction away from the operator causing movement of said shoulder portion in an up direction, movement of said hoist control element toward an operator causing movement of said shoulder portion in a downwardly direction, and wherein increased displacement of said control element from its off position in either direction of movement causes a proportional increase in speed of the raising and lowering of said shoulder portion.

4. The combination as specified in claim 3 wherein said hand and said shoulder portions are rotatably mounted about their respective axes, separate power means for rotating said shoulder and hand, separate control means for said hand and shoulder, each including a rotary switch movable from a center off position in either direction of rotation and causing rotation of its respective controlled member in corresponding direction upon movement of said switch from its center off position.

5. The combination as specified in claim 4 wherein said hand has a pair of gripping jaws, separate power means for operating said gripping jaws, and grip control means for controlling said last mentioned power means, said grip control means including a linearly movable control element movable in opposite directions from a center off position, said element being mounted in said control housing, a lug mounted on said control housing and positioned aligned with direction of movement of said control element and adapted to be grasped with the fingers of an operator, said lug and control element being positioned so that an operator can grasp said lug with his fingers and the control element with his thumb and grip to cause the gripping jaws to move together and upon movement of said element in opposite direction past said off position cause said jaws to open.

6. The combination as specified in claim 5 wherein all of said control elements are mounted on said control housing and said bridge, carriage and hoist control elements are grouped together at the left of the control housing, said upper arm, forearm and wrist control elements are grouped together in the center of the control housing, said shoulder rotate control element is positioned between the arm and wrist control elements and the hoist control element, said hand rotate control element is located to the right of said upper arm, forearm and wrist control element.

7. The combination as specified in claim 6 wherein said control housing has a top panel, said top panel being provided with a plurality of individual recess wells, each of said control elements being mounted in one of said recessed wells and being positioned completely below a plane defined by the top surface of said top panel.

8. The combination as specified in claim 5 wherein said hand is longitudinally extendable with respect to said wrist member, separate power means for extending said hand longitudinally, and hand extension control means for controlling said sixth power means, said hand extension control means including a linearly movable element movable in both directions from a center off position and connected to said last mentioned power means so that movement of said control element in direction away from said operator will cause extension of said hand and movement of said control element in direction toward said operator will cause retraction of said hand.

9. A manipulator having a gripping hand, an arm member mounting said hand, said arm member being movable about a pivotal axis, code indicia on said arm member and oriented to be completely on one side of a plane passing through said pivotal axis and longitudinally dividing said arm member, power means for controlling said arm member and control means for operating said power means including a control element linearly movable in at least one direction, said control element having code indicia associated therewith and positioned so that when said control element is moved toward its code indicia said arm will move in direction toward the code indicia thereon.

10. In a handling unit having components that are rotatably mounted, an electric motor for rotating said components, control means for controlling said electric motor including a switch comprising a housing, a rotary center tap potentiometer mounted on said housing, a pair of micro-switches mounted on said housing, each micro-switch controlling rotation of said electric motor in direction opposite from the other switch, said micro-switches being electrically connected to said motor through said potentiometer, rotary cam means for independently selectively closing each of said micro-switches, a separate rotary control element for driving said cam means and said potentiometer, said element being movable from a center off position in either direction of rotation to selectively simultaneously actuate one of said micro-switches and said potentiometer, increased rotation of said element from its off position causing increased speed of said electric motor.

11. A controller for remote handling unit having a hand member thereon, said hand member including a pair of gripping jaws, separate power means for operating said gripping jaws, and grip control means for controlling said power means, said grip control means including a linearly movable control element movable in opposite directions from a center off position, a control console, said control console having a top panel, said element being movably mounted with respect to said control console, a lug mounted on said top panel in position aligned with direction of movement of said control element and of size to be grasped with the fingers of an operator, said lug and control element being positioned so that an operator can grasp said lug with his fingers and the control element with his thumb and grip his hand to cause the gripping jaws to move together and upon movement of said element in opposite direction past said off position, cause said jaws to open.

12. A controller for a remote handling unit having mechanism movable in a predetermined path, drive means including a variable speed reversible electric motor for selectively moving the mechanism in each direction along said path, and a linearly movable switch for controlling the electric motor, said switch having an outer housing, a slide mounted for longitudinal movement in said outer housing, a control element fixedly attached to said slide and positioned so as to be accessible to an operator, a rack on said slide, a pinion gear engaging said rack, a shaft drivably mounted on said pinion gear and controlling a rotary potentiometer wired electrically to said electric motor for controlling the speed thereof, bias means urging said slide toward a center off position, and a connector bar adapted to complete a circuit to energize the electric motor through said potentiometer upon movement of said slide in either direction, movement of said slide in opposite directions causing opposite rotation of said electric motor.

13. A manipulator having a tool, an arm member mounting said tool, said arm member being movable about a pivotal axis, code indicia on said arm member and oriented thereon so as to indicate a direction of movement of the arm member about its pivotal axis, power means for controlling said arm member and control means for operating said power means including a control element movable in at least one direction, said control element having code indicia associated therewith and positioned so that when said control element is moved toward its code indicia said arm will move in direction toward the code indicia thereon.

References Cited by the Examiner

UNITED STATES PATENTS

| | | | |
|---|---|---|---|
| 1,466,280 | 8/1923 | Gross | 200—159 |
| 1,559,427 | 10/1925 | Hemphill | 338—198 X |
| 2,259,792 | 10/1941 | Batcheller | 338—78 |
| 2,456,522 | 12/1948 | McLaren et al. | 318—257 |
| 2,617,911 | 11/1952 | Carey et al. | 338—78 |
| 2,858,947 | 11/1958 | Chapman. | |
| 2,861,699 | 11/1958 | Youmans. | |
| 3,066,805 | 12/1962 | Sullivan. | |

GERALD M. FORLENZA, *Primary Examiner.*

ERNEST A. FALLER, HUGO O. SCHULZ, *Examiners.*